US007801854B2

(12) United States Patent
McKee et al.

(10) Patent No.: US 7,801,854 B2
(45) Date of Patent: Sep. 21, 2010

(54) MANAGING LISTS AND OTHER ITEMS IN AN ELECTRONIC FILE SYSTEM

(75) Inventors: Timothy P. McKee, Seattle, WA (US); Walter R. Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 10/986,961

(22) Filed: Nov. 15, 2004

(65) Prior Publication Data

US 2006/0106886 A1 May 18, 2006

(51) Int. Cl.
*G06F 17/00* (2006.01)
(52) U.S. Cl. ...................................... 707/625
(58) Field of Classification Search ................. 707/100, 707/200, 821
See application file for complete search history.

(56) References Cited

U.S. PATENT DOCUMENTS

| | | | | |
|---|---|---|---|---|
| 5,159,692 A * | 10/1992 | Imai et al. | ............... | 711/161 |
| 5,881,309 A * | 3/1999 | Ohashi et al. | ................. | 710/2 |
| 6,271,846 B1 * | 8/2001 | Martinez et al. | ............ | 715/854 |
| 6,356,946 B1 * | 3/2002 | Clegg et al. | ................. | 709/231 |
| 6,922,708 B1 * | 7/2005 | Sedlar | ........................ | 707/202 |
| 7,216,127 B2 * | 5/2007 | Auerbach | ................... | 707/100 |
| 7,281,014 B2 * | 10/2007 | Toner | ........................ | 707/101 |
| 7,383,286 B2 * | 6/2008 | Hamanaka et al. | .......... | 707/200 |
| 2003/0093420 A1 * | 5/2003 | Ramme | ........................ | 707/3 |
| 2004/0146199 A1 * | 7/2004 | Berkner et al. | .............. | 382/176 |
| 2004/0260736 A1 * | 12/2004 | Kern et al. | ................... | 707/204 |
| 2005/0049993 A1 * | 3/2005 | Nori et al. | ....................... | 707/1 |
| 2006/0206536 A1 * | 9/2006 | Sawdon et al. | .............. | 707/200 |

OTHER PUBLICATIONS

Fred Kuhns of CS523S: Operating Systems entitled File System Interface and Implementations, found Sep. 22, 2004, 40 pages, http://www.arl.wustl.edu/~fredk/Courses/cs523/fall01/Lectures/fs.ppt.

Ewa Deelman, Gaurang Mehta, Karan Vahi, How to for Running LIGO examples through Chimera VDS, GriPhyN, printed Sep. 22, 2004, 10 pages, http://www.griphyn.org/chimera/tutorials/chimera-LIGO-howto.pdf.

(Continued)

*Primary Examiner*—Neveen Abel Jalil
*Assistant Examiner*—Kellye D Buckingham
(74) *Attorney, Agent, or Firm*—Shook, Hardy & Bacon LLP

(57) ABSTRACT

An electronic file system organizational structure is provided that allows for items to be organized in a directed acyclic graph (DAG). While items may be organized hierarchically as in a tree structure, items may also have multiple direct parents. The electronic file system may further have access to multiple different stores. In addition, various techniques for managing items as they are manipulated and re-organized across different stores are discussed. For example, techniques are discussed for managing an item that has multiple direct parents all in the same first store, where the item is moved or copied to a second different store. Certain of these techniques may more closely match a user's intentions and/or have predictable results from users' points of view. In doing so, actions performed on one organization do not affect other organizations in unexpected or unintended ways.

10 Claims, 15 Drawing Sheets

OTHER PUBLICATIONS

Harold Boley of Stanford Medical Informatics, FlexDAGs: Navigation of Directed Acyclic Graphs by Depth Contracting/Expanding, Breadth Concealing/Exposing, and Incarnation Revolving, printed Sep. 22, 2004, 25 pages, http://www-smi.stanford.edu/pubs/SMI_Reports/SMI-1999-0806.pdf.

UnixOperatingSystem, Symbolic Link, printed Sep. 22, 2004, 4 pages http://c2.com/cqi/wiki?SymbolicLink.

Alternatives to Trees, printed Sep. 22, 2004, 11 pages http://www.qeocities.com/tablizer/sets1.htm.

Benja Fallenstein and Tuomas J. Lukka, Hyperstructure: Computers built around things that you care about, printed Sep. 22, 2004, 23 pages, http://www.nongnu.org/fenfire/manuscripts/2004/hyperstructure.

Symbolic Link Rant, printed Sep. 22, 2004, 1 page, http://c2.com/cgi/wiki?SymbolicLinkRant.

Serge van den Oever [Macaw], Things that make my working world go round—Net/C#/SharePoint/..., printed Sep. 22, 2004, 2 pages, http://weblogs.asp.net/soever/archive/2003/11/03/35478.aspx.

* cited by examiner

FIGURE 2: MOVE ITEM
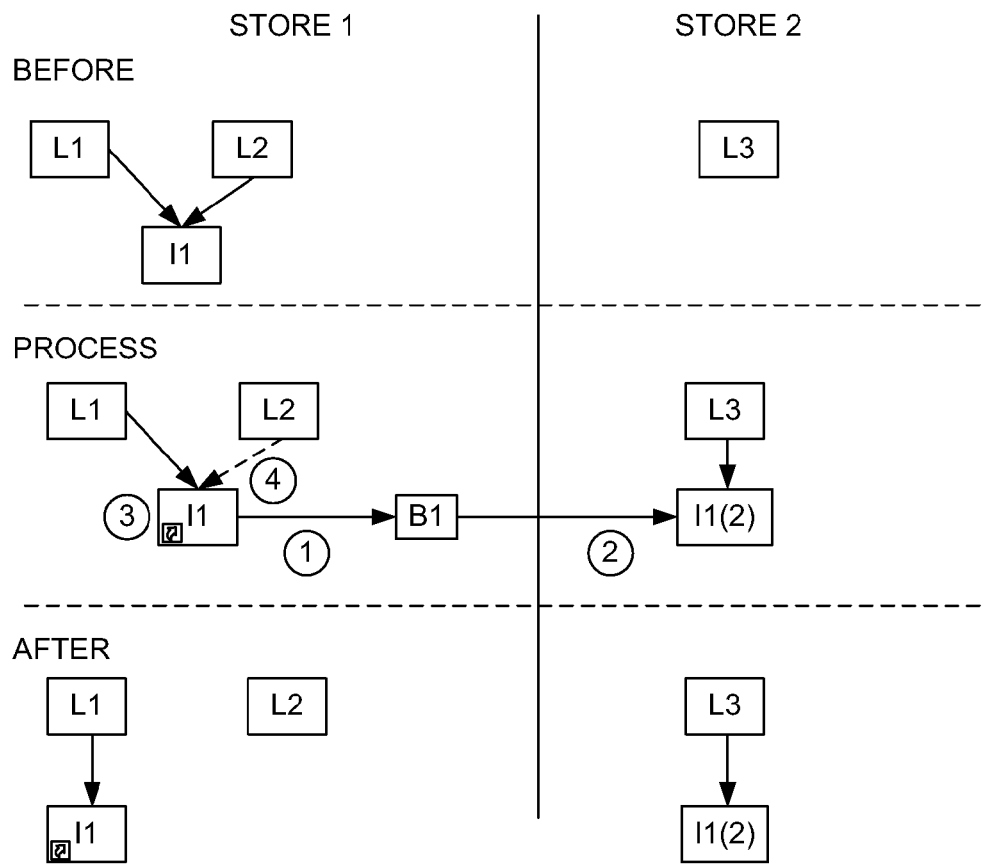
FIGURE 3: MOVE ITEM BACK
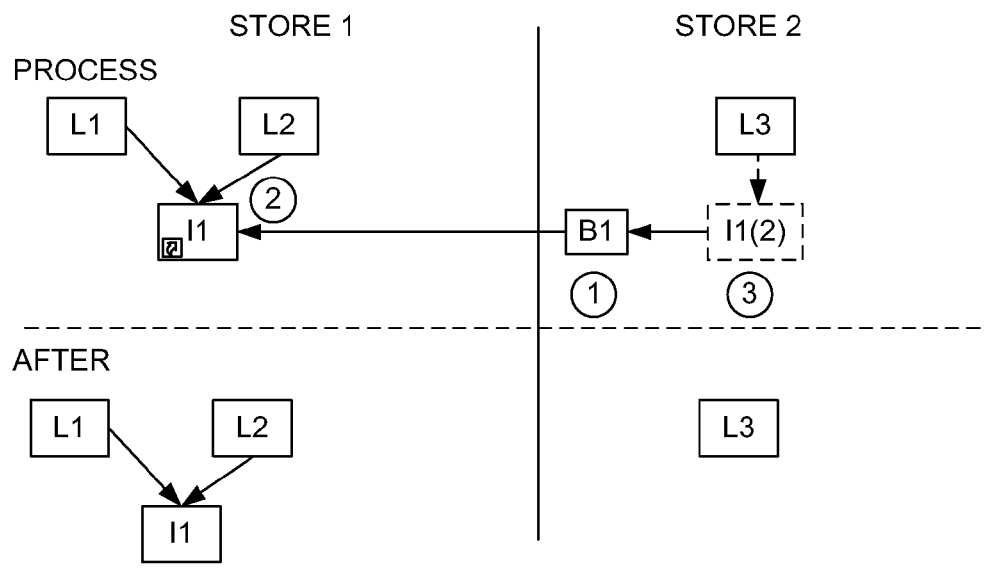

Figure 4: Add
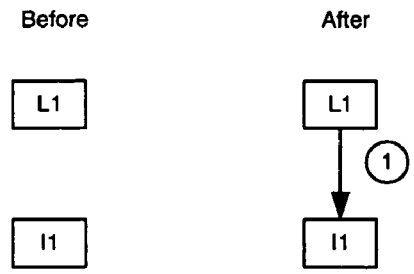
Figure 5: Remove
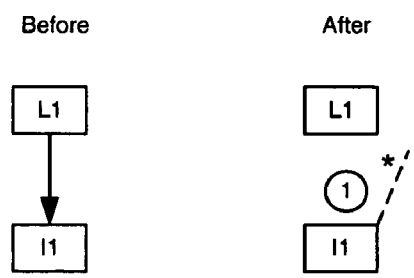
Figure 6: Copy Item
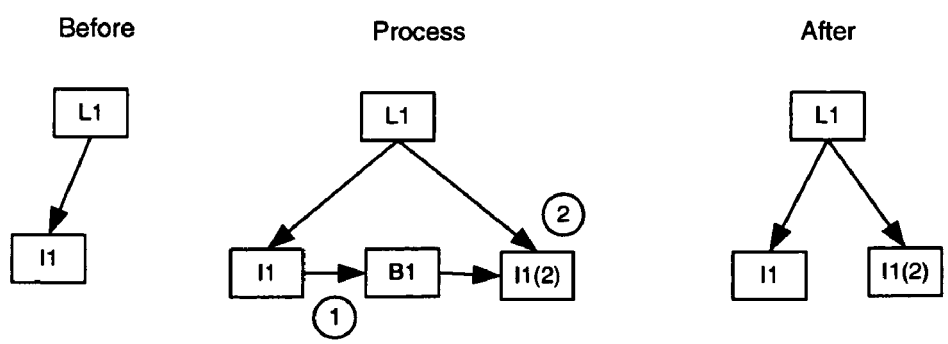

Before
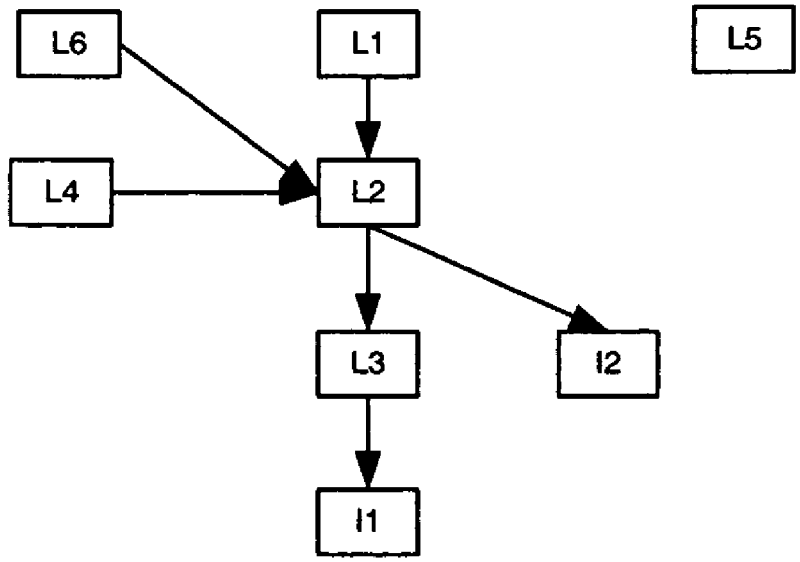
After
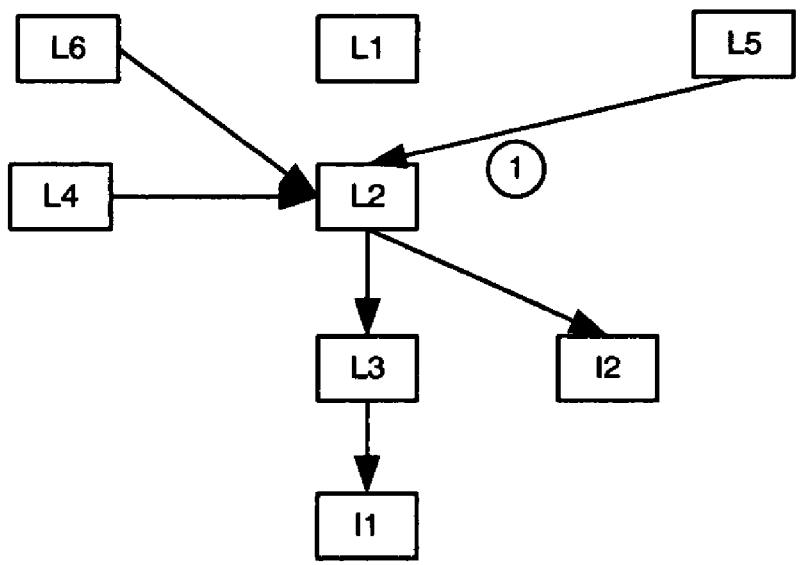
Figure 7: Move List Same Store

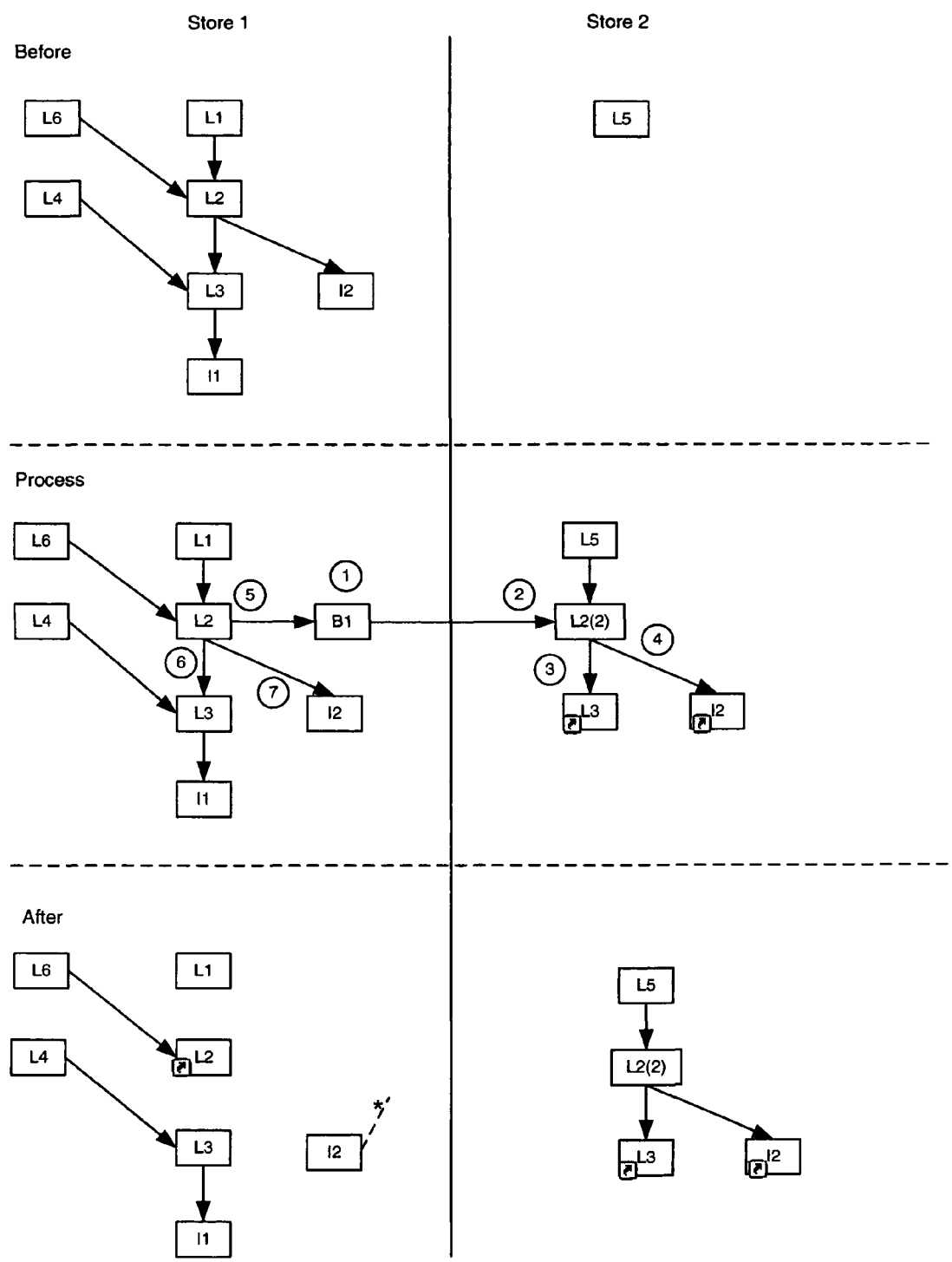
Figure 8: Move List Shallow

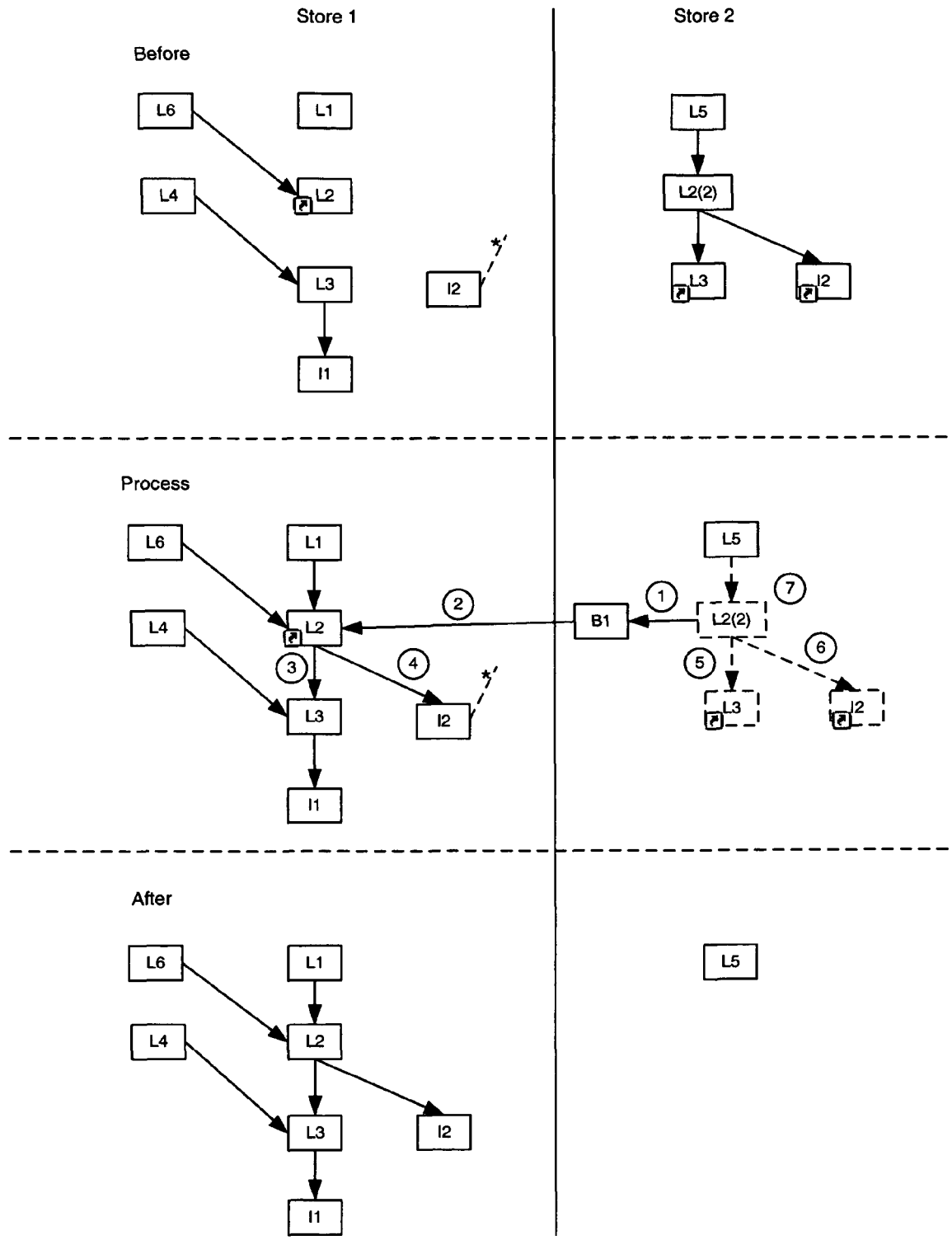
Figure 9: Move List Shallow Back

Figure 10: Move List Structure
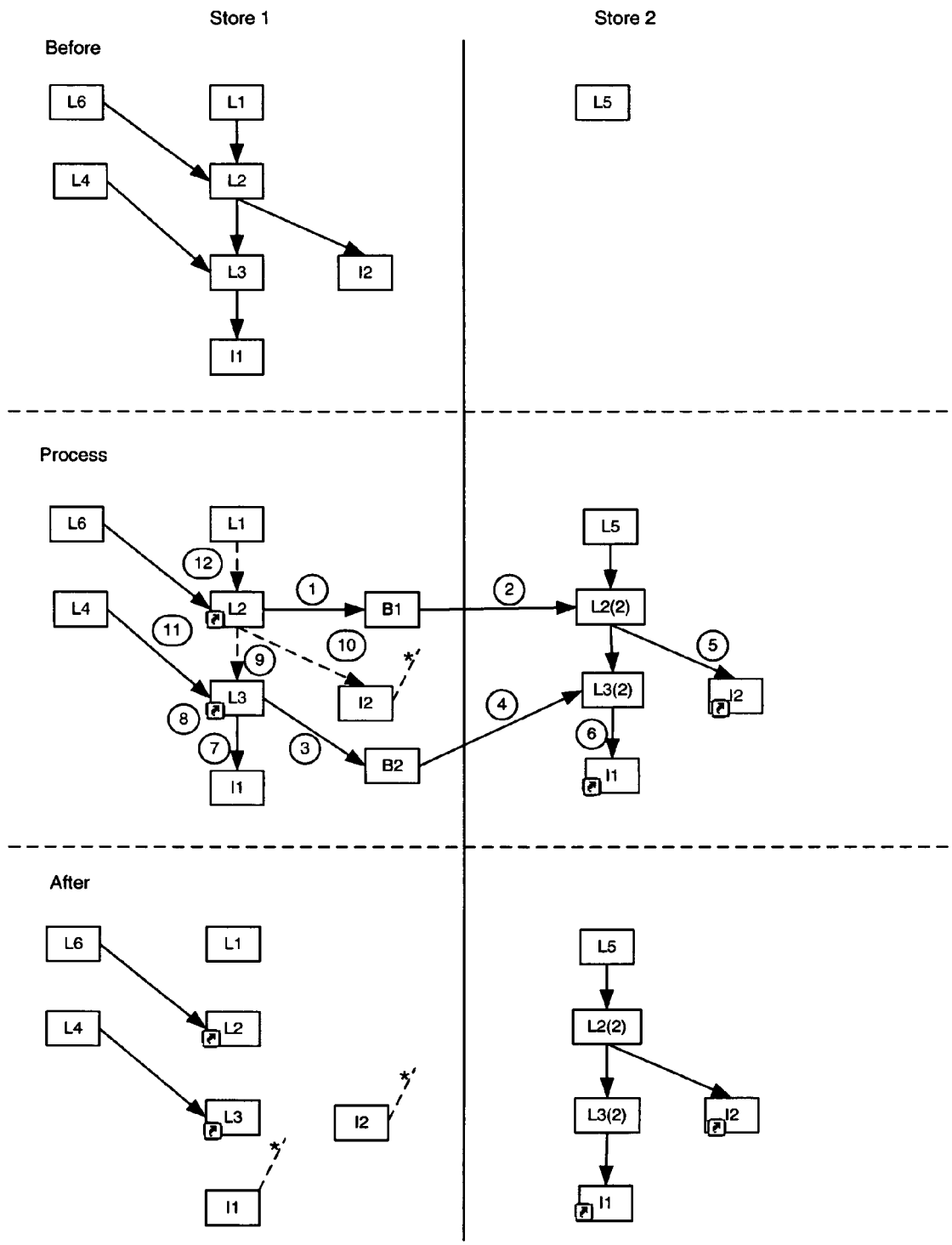

Figure 11: Move List Structure Back
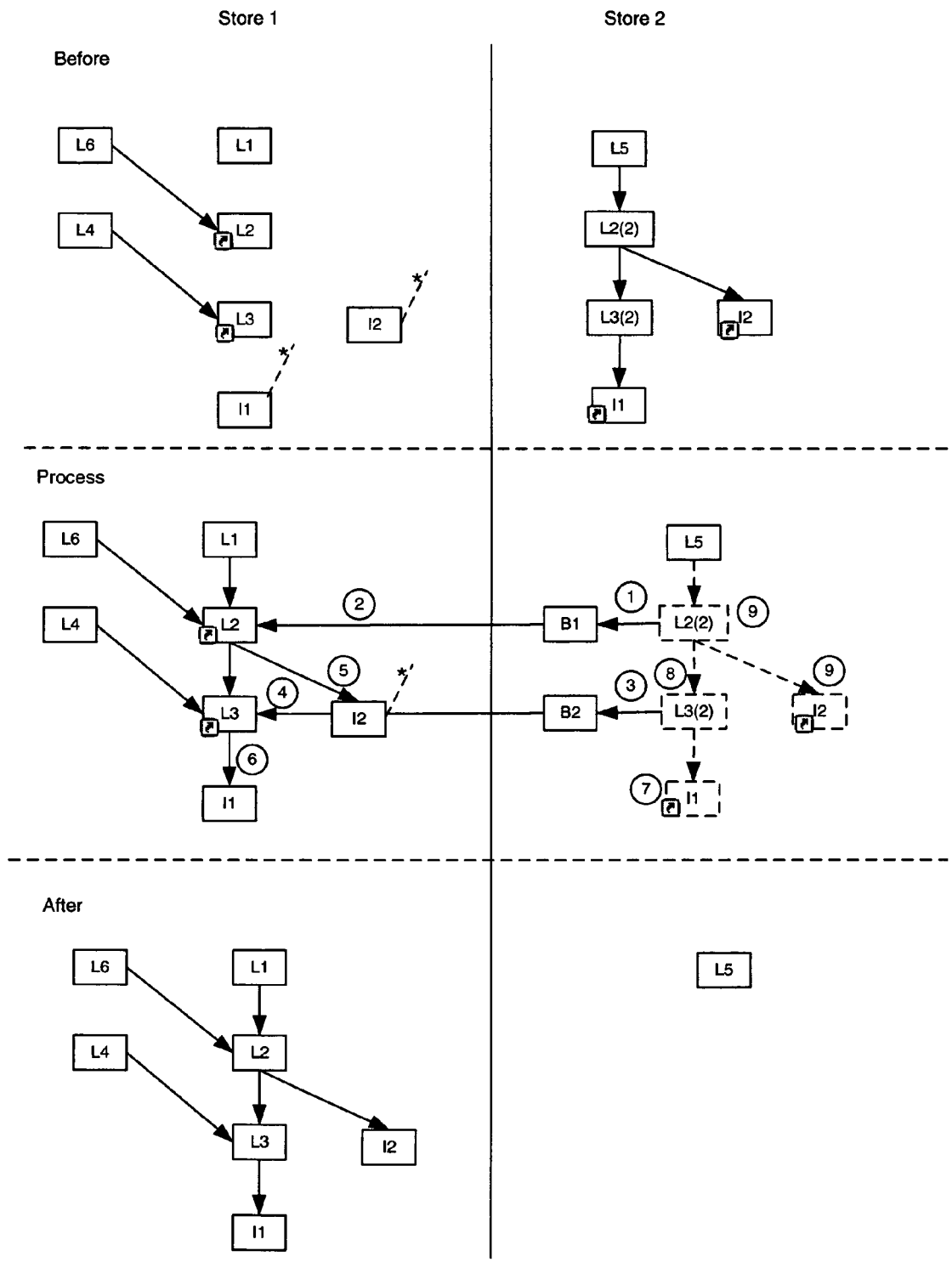

Figure 12: Move List Deep
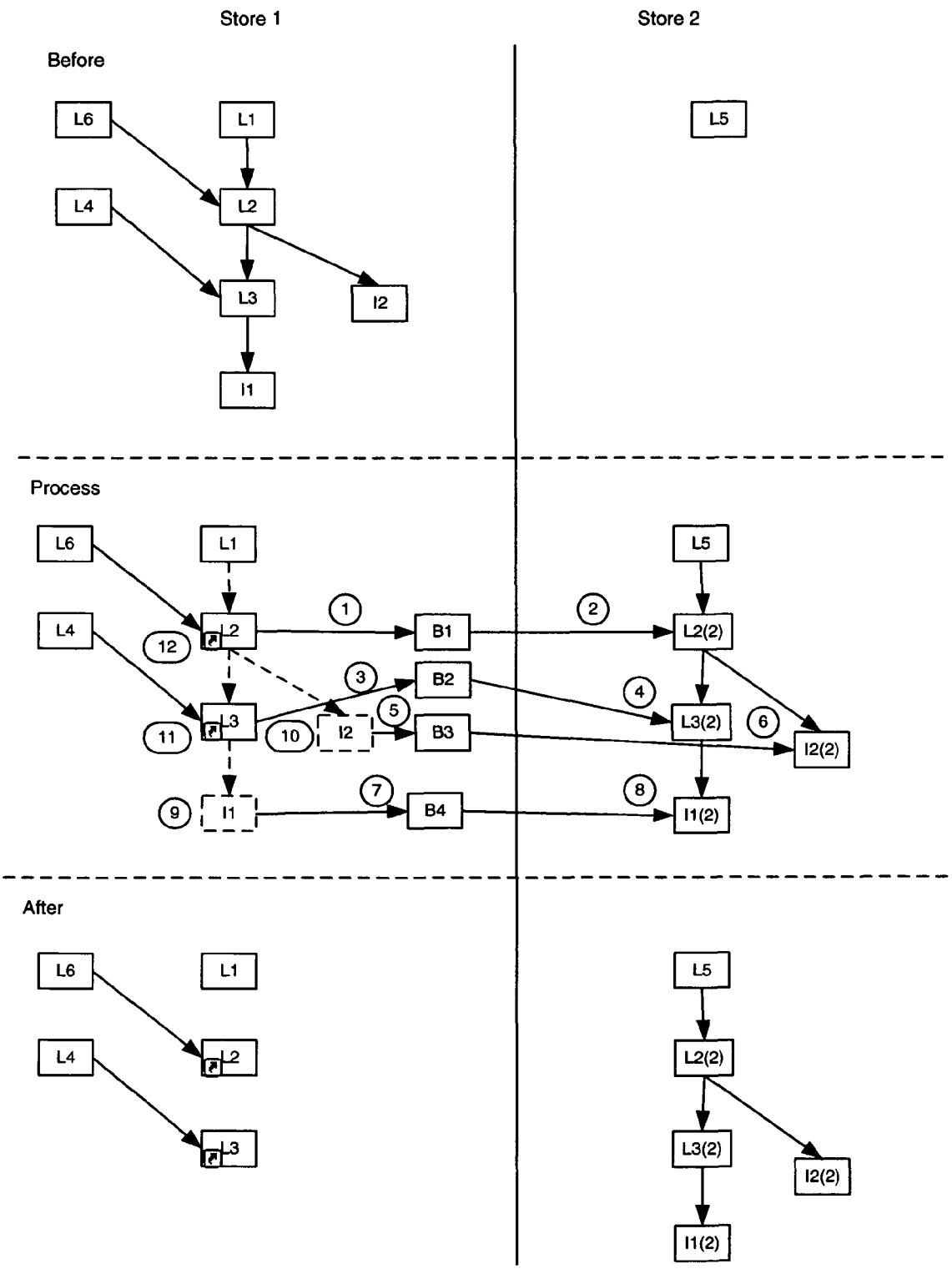

Figure 13: Move List Deep Back
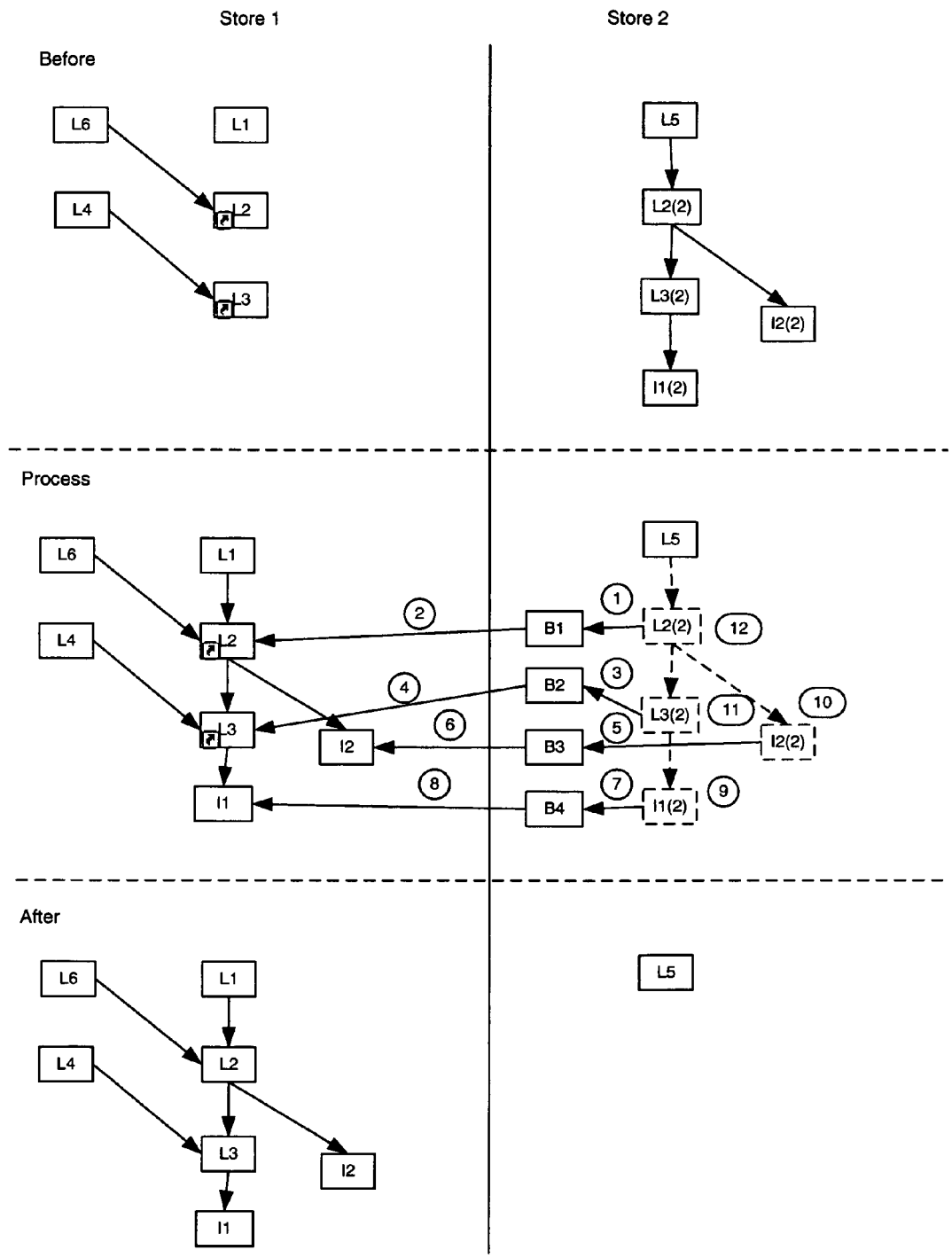

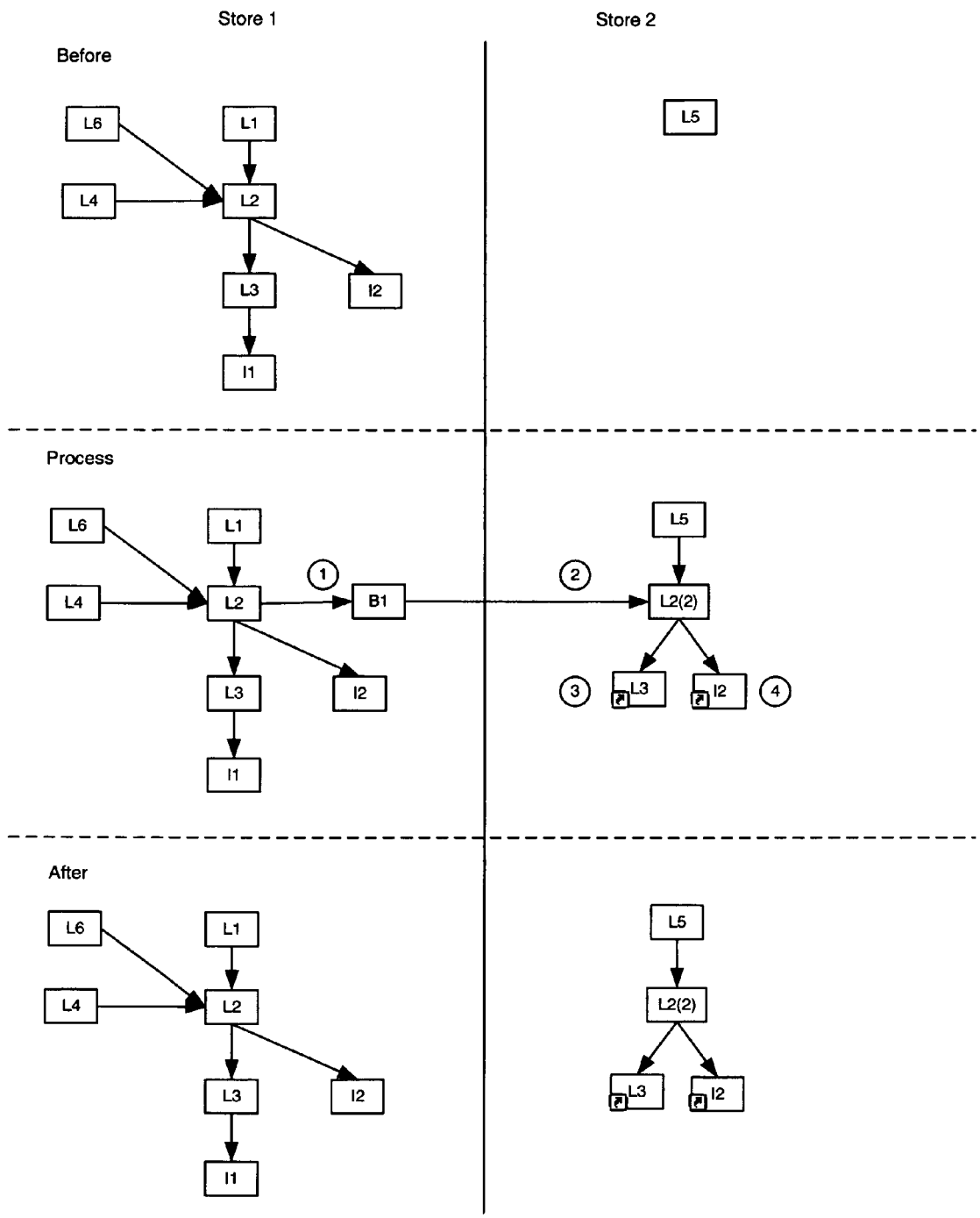
Figure 14: Copy List Shallow

Figure 15: Copy List Structure
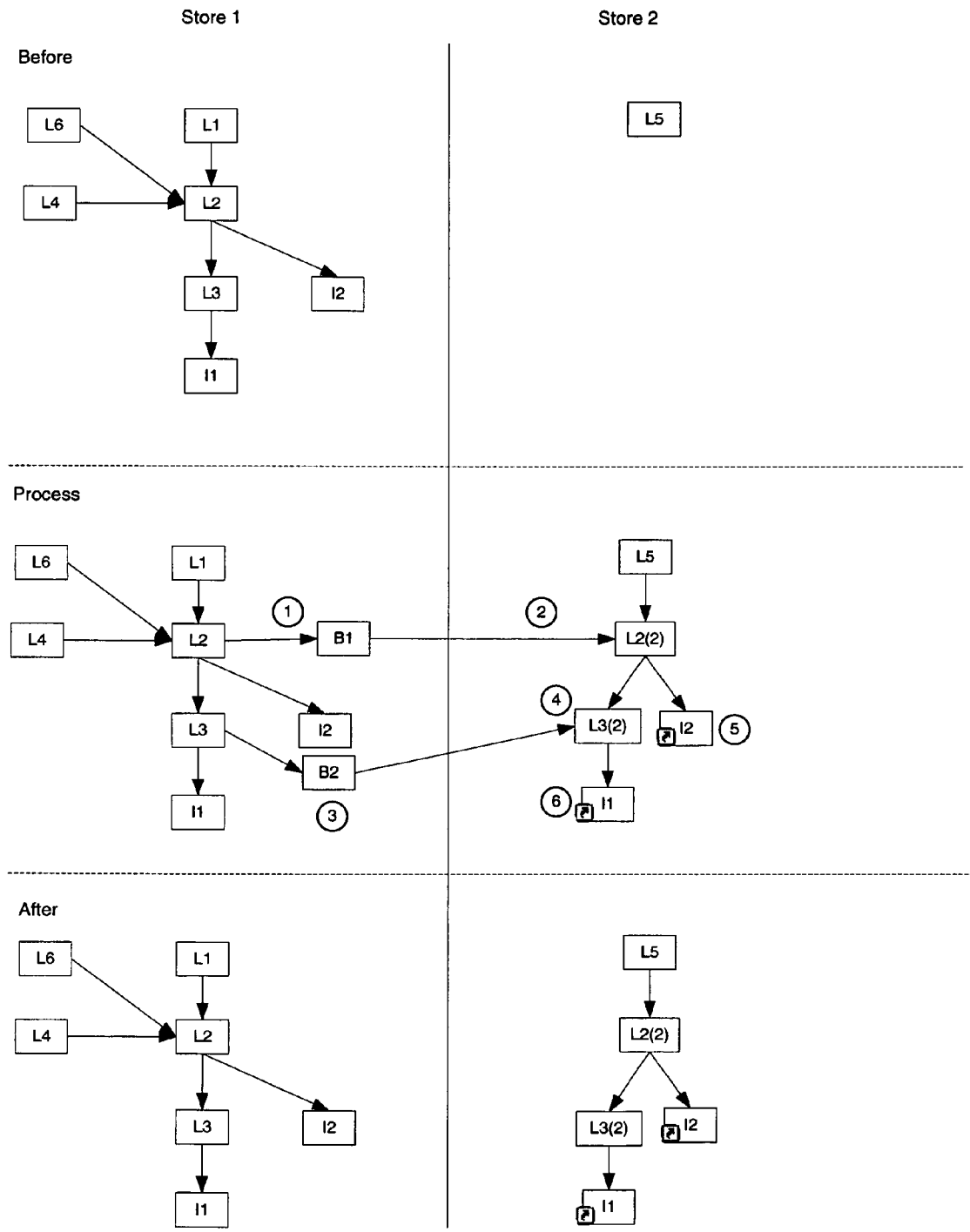

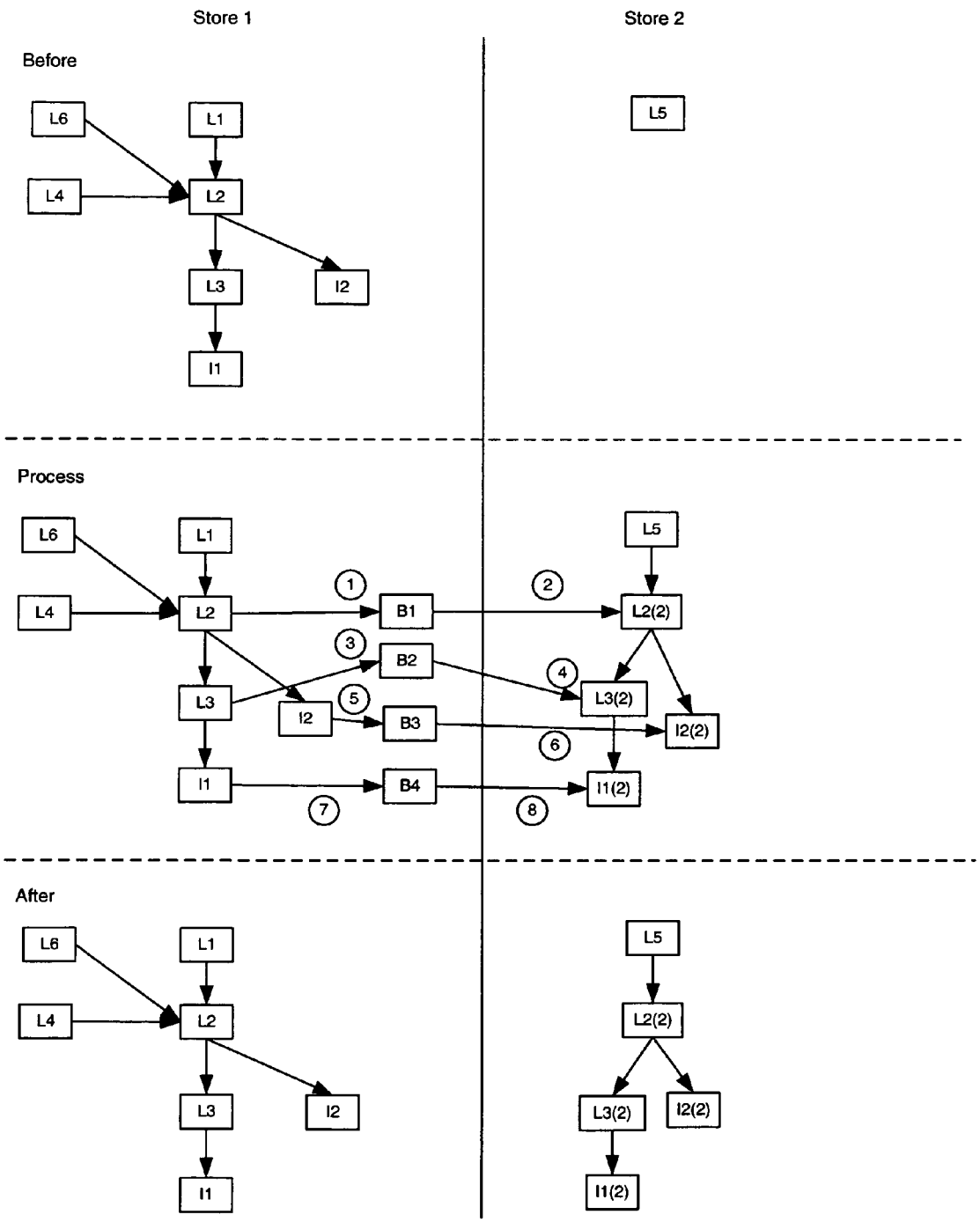
Figure 16: Copy List Deep

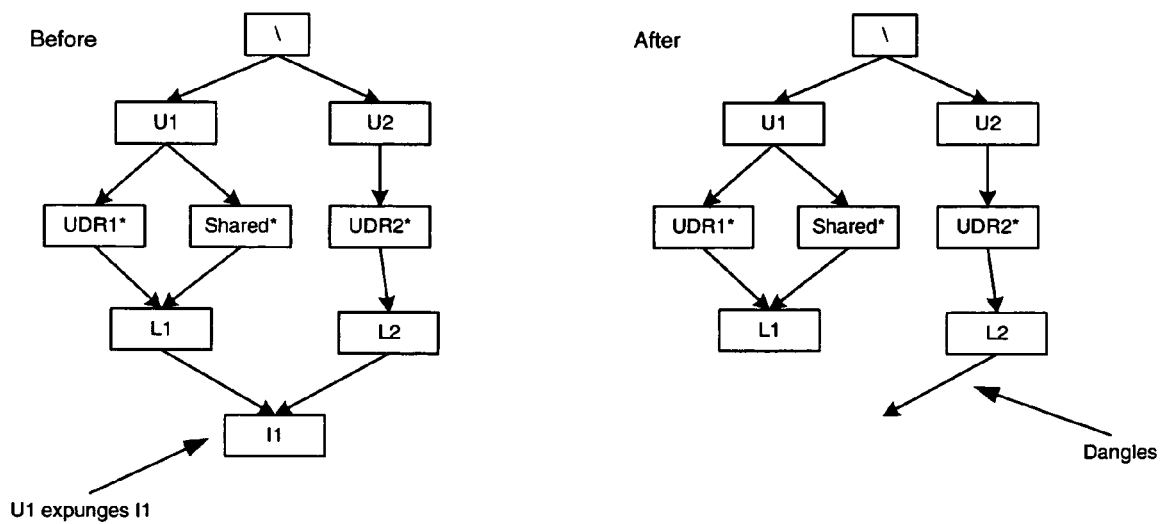
Figure 17: Expunge

Figure 18: Recycle
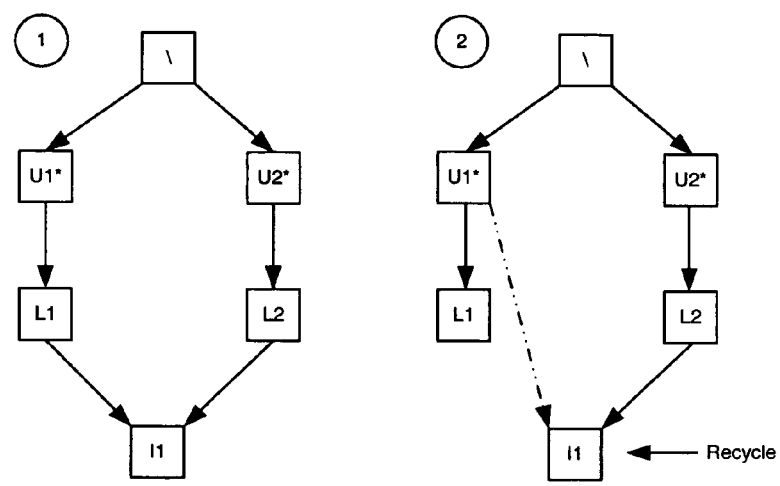
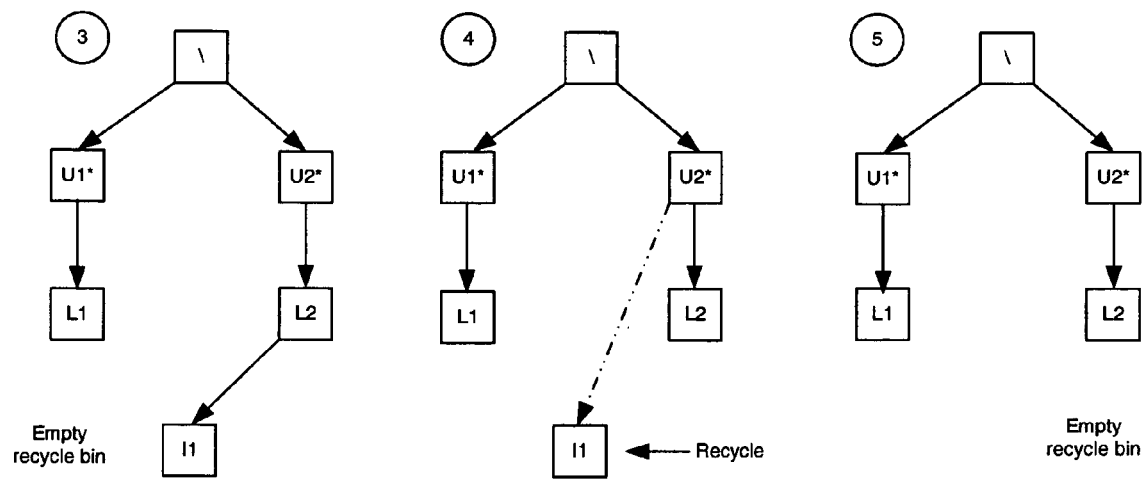

MANAGING LISTS AND OTHER ITEMS IN AN ELECTRONIC FILE SYSTEM

FIELD OF THE INVENTION

Aspects of the present invention are directed generally to managing items in an electronic file system, such as an electronic file system imposing a directed acyclic graph architecture that has access to one or more stores of items.

BACKGROUND OF THE INVENTION

Modern electronic file systems typically store files in a hierarchical tree structure. Each node of the tree is considered a folder that contains one or more files. Typically, in such electronic file systems the location of an item is limited by the organization defined the file system. For example, in many file systems each file is located in one (and only one) folder. In other words, each file has only one direct parent. Although this may have been fine years ago, this tree structure is becoming quite limiting. Traditional hierarchical tree structures are inflexible; in a tree, file lifetime and file organization are conflated. That is, a file can exist only while it has a location organized relative to other files or folders. In addition, a file cannot be placed in multiple organizations. This means that if a user wishes to view a file in multiple folders, for example, the user must make multiple copies of the file. This is both tedious and error-prone for the user, as well as wasteful of storage space.

There is a need to develop a new electronic file system organizational structure that more easily allows users to share access to files, as well as to control that access. With this organizational structure come new challenges in managing the items in that organizational structure.

SUMMARY OF THE INVENTION

Aspects of the present invention are directed to providing an electronic file system organizational structure that allows for items to be organized in a directed acyclic graph (DAG). This means that, while items may be organized hierarchically as in a tree structure, items may also have multiple direct parents. A DAG organizational structure will allow multiple parents but will not allow a child item to be a parent of an item that is a direct or indirect parent of that item. In other words, DAG provide for multiple branches into and out of items but do not provide for cyclic branches. This organizational structure provides the flexibility needed to properly handle multiple user file sharing and access control.

Further aspects of the present invention are directed to providing the electronic file system with access to multiple different stores. A store is an internally consistent representation of data. A store may span multiple physical storage devices (e.g., hard drives) but is conceptually considered by the file system to be one storage unit. A store may make certain guarantees about the items within the store and the holding links within the store, but not about items and holding links in another store. In addition, the rules for lifetimes of items and consistency of links may apply within the same store but not necessarily across different stores. In some embodiments, an item may only have one or more parents that are in the same store as the item itself. In other words, holding links between parent and child would not cross stores.

Still further aspects of the present invention deal with how items are managed as they are manipulated and re-organized across different stores. These aspects deal with, for example, what may happen to an item that has multiple direct parents all in the same first store, where the item is moved or copied to a second different store. Although there may be more than one way to manage such operations, some ways may more closely match a user's intentions and/or have more predictable results from users' points of view.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 2 functionally shows steps that may be taken to move an item across stores, in accordance with at least one aspect of the present invention.

FIG. 3 functionally shows steps that may be taken to move an item back, thus reversing the operation shown in FIG. 2, in accordance with at least one aspect of the present invention.

FIG. 4 functionally shows steps that may be taken to add an item to a list, in accordance with at least one aspect of the present invention.

FIG. 5 functionally shows steps that may be taken to remove an item from a list, in accordance with at least one aspect of the present invention.

FIG. 6 functionally shows steps that may be taken to copy an item, in accordance with at least one aspect of the present invention.

FIG. 7 functionally shows steps that may be taken to move a list within the same store, in accordance with at least one aspect of the present invention.

FIG. 8 functionally shows steps that may be taken to "shallow" move a list across stores, in accordance with at least one aspect of the present invention.

FIG. 9 functionally shows steps that may be taken to "shallow" move a list back across stores, thus reversing the operation shown in FIG. 8, in accordance with at least one aspect of the present invention.

FIG. 10 functionally shows steps that may be taken to "structure" move a list across stores, in accordance with at least one aspect of the present invention.

FIG. 11 functionally shows steps that may be taken to "structure" move a list back across stores, thus reversing the operation shown in FIG. 10, in accordance with at least one aspect of the present invention.

FIG. 12 functionally shows steps that may be taken to "deep" move a list across stores, in accordance with at least one aspect of the present invention.

FIG. 13 functionally shows steps that may be taken to "deep" move a list back across stores, thus reversing the operation shown in FIG. 12, in accordance with at least one aspect of the present invention.

FIG. 14 functionally shows steps that may be taken to "shallow" copy a list across stores, in accordance with at least one aspect of the present invention.

FIG. 15 functionally shows steps that may be taken to "structure" copy a list across stores, in accordance with at least one aspect of the present invention.

FIG. 16 functionally shows steps that may be taken to "deep" copy a list across stores, in accordance with at least one aspect of the present invention.

FIG. 17 functionally shows steps that may be taken to expunge a list, in accordance with at least one aspect of the present invention.

FIG. 18 functionally shows steps that may be taken to recycle a list, in accordance with at least one aspect of the present invention.

DETAILED DESCRIPTION OF ILLUSTRATIVE EMBODIMENTS

An Illustrative Computing Environment

Figure 1:
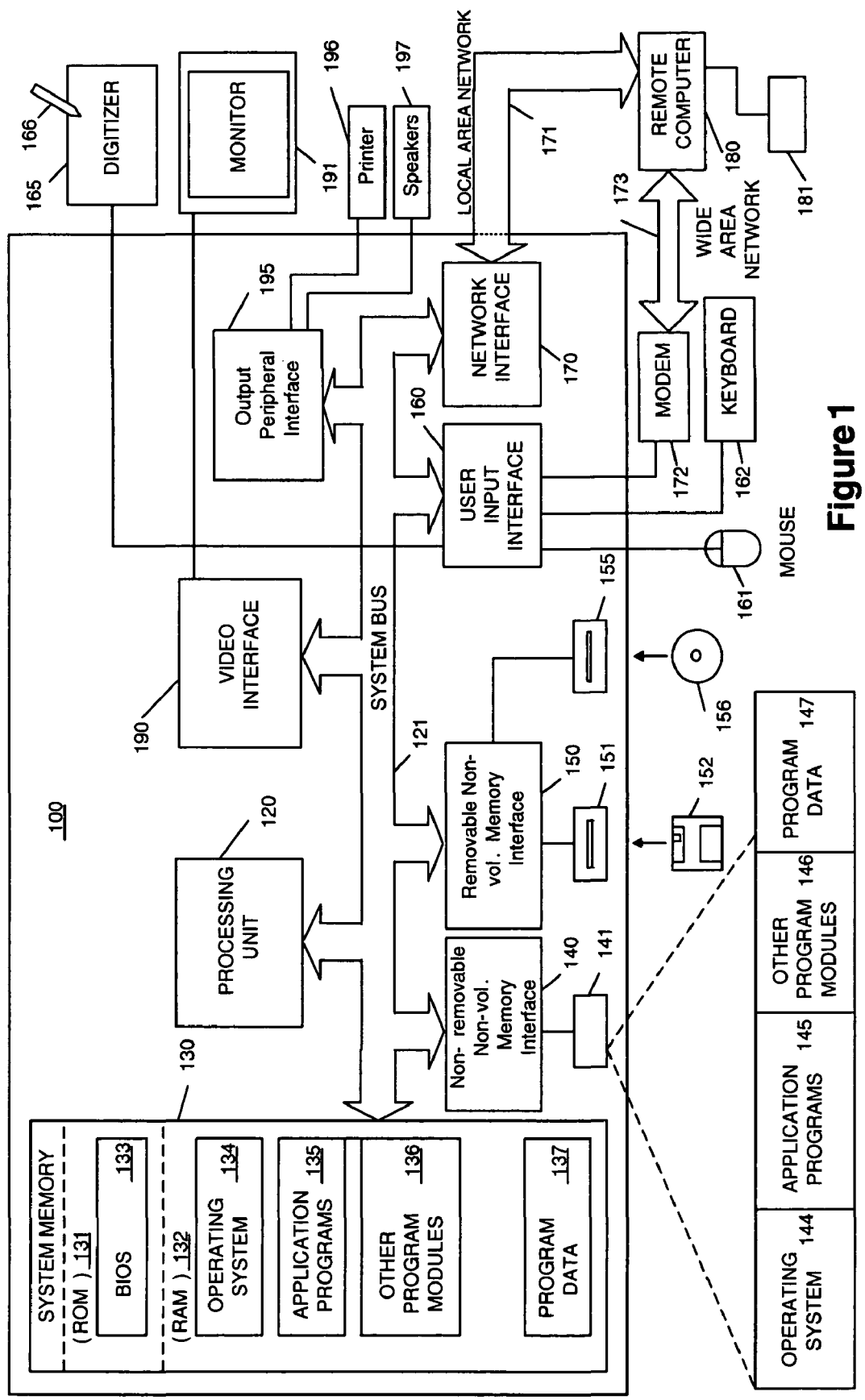
FIG. 1 is a functional block diagram of an illustrative computing device that may be used with aspects of the present invention.

Aspects of the present invention may be used in connection with a computing device such as the computer 100 illustratively shown in FIG. 1. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. In the shown example, the hard disk drive 141 for example may be considered one store, while a CD ROM used in the optical disk drive 155 may be considered another different store. In addition, partitions within the hard disk drive 141 may each be considered a different store. As another example, a plurality of internal hard drives may be configured as a single large store or as multiple smaller independent stores, as desired.

Data stored on any of the various computer storage media may be stored in a variety of formats. For example, data may be stored in discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 120 directly, via parallel port or another interface, or via the system bus 121 by any technique, either wired or wirelessly. The pen 166 may further have other sensing systems for determining strokes of electronic ink including, e.g., accelerometers and magnetometers.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated by way of example in FIG. 1. Illustrative logical connections external to the computer 100 as depicted in FIG. 1 may include a local area network (LAN) 171 and/or a wide area network (WAN) 173, and may also include other networks. Such networking environments are commonplace in offices, enterprise-wide computer networks, intranets and the Internet. The computer 100 may further include wired and/or wireless capabilities. For example, the network interface 170 may be Bluetooth, SWLan, and/or IEEE 802.11 compatible. It is appreciated that other wireless communication protocols may be used in conjunction with these protocols or in place of these protocols.

When used in a LAN networking environment, the computer 100 may be connected to the LAN 171 through a network interface or adapter 170. When used in a WAN networking environment, the computer 100 may include a modem 172 or other means for establishing communications over the WAN 173, such as the Internet. The modem 172, which may be internal or external, may be connected to the system bus 121 via the user input interface 160 or other appropriate mechanism.

The storage media of the remote computer 180 and/or any other device external to the computer 100 may also be considered additional stores that are accessible by the electronic file system via the logical connections external to the computer 100. For example, the hard disk drive of the remote computer 180 may be accessible by the electronic file system executed on the computer 100, and that hard disk drive (and/or other storage devices grouped with the hard disk drive, such as another hard disk drive) may itself be considered a store. Or, one or more servers external to the computer 100 may be accessible by the electronic file system via the Internet, and each of those servers or groups of servers may be considered a store.

Illustrative Organizational Structure Imposed by Electronic File System

The electronic file system executing on the computer 100 may impose a directed acyclic graph (DAG) organization of items. An item may be nearly any type of discrete data structure, such as a file (e.g., a word processing file, a photo, an MP3 song, etc.), a contact, a calendar item, an email item, or even a list of other items. A list-type item may or may not be an ordered list, and may be considered analogous to a traditional folder. When a list lists an item, that list is considered the parent and that item is considered the child. The child item will be referred to herein as being organized directly under a parent list if that item is listed by that parent list. This is also known as a holding relationship between the parent list and the child item. A child item will be referred to herein as being organized under a parent list if that item is organized directly or indirectly under the parent list, as will be illustrated below with regard to FIG. 7. To provide the added flexibility of a full DAG architecture, multiple different lists may all list, or have under them, the same item. In other words, an item may have multiple parents.

For example, the top portion of FIG. 7 functionally shows an illustrative organizational structure that may be imposed and managed by the electronic file system. In this example, list L2 is organized directly under each of list L1, list L4, and list L6. Thus, list L2 has three direct parents. List L3 is organized directly under list L2, but it is also organized under lists L1, L6, and L4, albeit indirectly. Non-list item I1 (e.g., a file or a non-file-backed item that is purely schematized with no file stream) is organized directly under list L3 and indirectly organized under lists L1, L2, L4, and L6. Non-list item I2 is organized directly under list L2 and indirectly organized under lists L1, L4, and L6.

In addition, the electronic file system may provide for one or more workspaces in which one or more items may be placed. An items in a workspace may or may not have a organization relative to another item in the workspace. For example, items L1, L2, L3, L4, L6, I1, and I2 may be in the same workspace, which may functionally be thought of as a box enclosing those items. Each of those items has an organization relative to the others. However, list L5 (FIG. 7) may also be in the same workspace but may not have an organization relative to the other items. In this example, list L5 is considered a "floating" item, as are lists L1 and L4. An item is a floating item if the item is not held by, or organized under, any other item. If an item is placed in a workspace, it remains in that workspace until it is removed from the workspace. Thus, within a workspace, items may (or may not be) organized as desired without affecting whether the items are within the workspace.

Once the above-described organizational structure is imposed, there are certain issues that need to be considered in managing items. For instance, because an item may be directly or indirectly organized under more than one parent list, there are many possible ways of handling a request to move or copy the item. Perhaps the user intends to move the item from one of the parent lists from not necessarily from the other parent lists in fact, the user may not even know that the other parent lists exist or that they hold the item sought to be moved. Examples of these situations, and illustrative solutions, are described below.

Non-List Item Operations

The following are examples of operations that may be performed on items. An operation may be made within the same store or across stores ("cross store"). For example, an item may be moved from one location to another within the same store. Or, the item may be moved cross store from a first store to a second store. Examples of both are described below.

Move Item—Cross Store

It is assumed for purposes of this discussion that holding links cannot cross stores. Therefore, if an item is simultaneously in two different organizations (e.g., in two different lists) in a first store, and if the user attempts to move one of these organizations to a second store, then there are several possible ways this can be handled. Referring to FIG. 2, for example, item I1 is simultaneously held by both lists L1 and L2 in Store 1. Store 2 has list L3. Suppose that the user wishes to move item I1 from list L2 to list L3. A first possibility would be to move item I1 to Store 2 so as to be in list L3. However, this would break the organization of item I1 also being in lists L1 and L2. This is likely not the user's intention, especially considering that the user may not have been interacting with list L1, and indeed may not even have been aware of list L1. A second possibility is that item I1 would be copied to list L3. However, this also would change the overall organization in that there would now be two copies of item I1. This would likely be an unexpected result since the user intended to move item I1 (not copy item I1), perhaps to free up storage space in Store 1. A third possibility is that the move operation could fail, but most users would find this result irritating. A fourth possibility is to convert item I1 into a proxy item. A proxy item is a shortcut, or pointer, with the metadata of the pointed-to item (i.e., item I1). This fourth possibility allows the organization to mimic as closely as possible the pre-move organization.

Referring to FIG. 2, which shows this fourth possibility, steps are shown (not necessarily in chronological order) using circled numbers, whereas items are shown as boxes. As shown in this example, in steps 1 and 2 item I1 is moved from List L2 Store 1 to List L3 in Store 2. In particular, in step 1 item I1 is serialized as blob B1, which represents a duplicate of item I1. Then, in step 2, blob B1 is deserialized into item I1(2), which becomes held by list L3. Although this new item is referred to herein as item I1(2), item I1(2) is a duplicate of original item I1. This naming scheme is for discussion purposes only and is used merely to distinguish that item I1(2) is technically not original item I1. In other words, item I1(2) may utilize different storage (e.g., different sectors on a different hard drive) than did the original item I1, even though it is otherwise a duplicate of item I1. A duplicate may be made by serializing an item (e.g., item I1) as a blob and then deserializing that blob into another item (e.g., item I1(2)).

Referring still to FIG. 2, in step 3, item I1 is converted into a shortcut (or proxy item) to item I1(2). The proxy item is an item that points, or links, to a target item but does not contain all of the substantive data of the target item. The reason for this is that the user only intended to move item I1 from list L2, but not necessarily also from list L1, which also has a holding link on item I1. Thus, by creating the proxy item to item I1(2), a user that looks under list L1 will still see item I1 as though it were never affected by the move operation. This is likely the intention of a user that only requested that item I1 be moved from list L2, without reference to list L1. Also, by replacing or converting item I1 into a proxy item, storage space in Store 1 is freed, which is consistent with the user's intention to move item I1 from Store 1 to Store 2. If original item I1 were maintained in Store 1 because it is also held by list L1, then the move operation would not have freed up storage space in Store 1. Such a result would likely go against the user's intentions. Finally, in step 4, the relationship between list L2 and item I1 is severed such that item I1 is no longer listed by list L2, as likely intended by the user. Thus, the result is that item I1 is now listed by list L1 (albeit as a proxy item) and list L3, but not list L2.

Move Item Back—Cross Store

As stated previously, it may be desirable to operate on items in a predictable manner that most likely match the user's expectations and desires. This includes reversibility. In other words, it may be desirable that, by initiating a first action to change the organization of an item or items, and then by performing the reverse action, the organization should revert back to the original organization that existed prior to the first action. Although reversibility is not required, it may be desirable for some or all of the operations described herein. If, for example, the user initially moved item I1 to list L3 as discussed above with regard to FIG. 2, and then if the user immediately performed a move operation moving item I1(2) to list L2, then the resulting organization should preferably be identical to the original organization prior to the initial move operation. This is shown illustratively in FIG. 3. First, in step 1, item I1(2) is serialized into blob B1, which represents a duplicate of item I1(2). In step 2, it is determined whether there exists a proxy item targeting the item to be moved. In this example, such a proxy item does exist; proxy item I1 targets item I1(2), the item to be moved. If such a proxy item exists, the proxy item is removed and replaced with a duplicate of item I1(2), which in this case will be referred to as item I1. If such a proxy item does not exist, then the proxy item does not need to be removed or replaced. In either event, item I1(2) is duplicated as item I1, which is completed by deserializing blob B1 into item I1. In step 3, because item I1(2) is listed only by a single list, list L3, a proxy item to item I1 does not need to be created under list L3. Thus, item I1(2) is removed from list L3 (and expunged from Store 2). Thus, the result of moving item I1(2) back to list L2 is an organization that is identical to the original organization shown in FIG. 2.

Add Item

FIG. 4 shows an illustrative embodiment where item I1 is added to list L1. In this example, a single step may be performed in which a holding relationship is created between item I1 and list L1 such that list L1 holds item I1. Of course, item I1 may be added to other lists as well, since multiple lists can hold the same item. In addition item I1 may be added such that it is not held by any list. Such an item is referred to herein as a floating item.

Remove Item

FIG. 5 shows an illustrative embodiment where item I1 is removed from list L1 (but not recycled or expunged). In this case, item I1 is held only by list L1, so once removed from list L1, item I1 becomes a floating item that is not held by any list. If item I1 had also been held by another list, e.g., a list L2, then the result of removing item I1 from list L1 would have been that item I1 would have only been held by list L2.

Copy Item—Same Store

Referring to the illustrative embodiment shown in FIG. 6, the user may request that item I1 be copied within the same store. One possibility is that a copy (item I1(2)) is created to be a floating item. Another possibility is that item I1(2) is organized in the same manner as original item I1. In this latter case, in step 1, item I1 is serialized into blob B1, which represents a duplicate of item I1. Then, in step 2, blob B1 is deserialized as item I1(2), and a holding relationship between list L1 and item I1(2) is established to match the holding relationship between original item I1 and list L1. Had item I1 been held by both list L1 and another list L2, than item I1(2) still would have been copied such that it would have been held only by list L1. This is because, in this example, original item I1 was copied in the context of list L1, and actions in the context of list L1 would not affect other independent lists such as list L2.

List Operations

The above examples have dealt with operations on non-list items. Other operations on non-list items may be performed, such as recycle or expunge. In addition, operations may also be performed on lists. These are referred to as list operations. For example, lists may be copied, moved, added, deleted, recycled, or expunged. Examples of list operations are now described. Depending upon how a list operation is performed, a list operation may affect less of the organization surrounding the selected list(s) or more of the organization.

Move List—Same Store

For example, a list may be moved within the same store. This may be a fairly straightforward operation, such as shown in FIG. 7. Here, the user desires to move list L2 from list L1 to list L5. Thus, the holding link to list L2 from list L1 is broken and a new holding link is established from list L5 and list L2. Because the move is made within the same store, there is no need to affect the remaining organization, such as lists L3, L4, and L6, and items I1 and I2.

Move List Shallow—Cross Store

Described herein are three versions of a list move operation between stores. In the first version, a "shallow" move may be performed such as shown in FIG. 8. A shallow move, also known as a move list shallow operation, moves the selected list only. Thus, for example, where the user desires to shallow move list L2 from list L1 in Store 1 to list L5 in Store 2, the following steps may be performed. In step 1, list L2 is serialized to create blob B1, which represents a duplicate of list L2. In step 2, blob B1 is deserialized into list L2(2), which is a copy of list L2. In step 3, since only selected list L2 should move to Store 2, a proxy item to list L3 is created and a holding link to that proxy item is created from list L2(2). Similarly, in step 4, a proxy item to item I2 is created and a holding link to that proxy item is created from list L2(2). Thus, the resulting organization is that only the selected list L2 itself has been moved. In step 5, because original item L2 is held by another list (i.e., list L6), item L2 should not simply be expunged. Otherwise, this would disturb organization that was not explicitly requested to be changed. As previously discussed, the user only intended to move list L2 from list L1, but not from any other list. Thus, item L2 is either replaced with or converted into a proxy item to L2(2) so that it may still be referred to (within the same store) by list L6. In steps 6 and 7, since original list L2 no longer exists in Store 1 but has instead become list L2(2) in Store 2, there is no longer any need for the holding link between list L2 and list L3, and between list L2 and item I2. Thus, these holding links are removed. Because item I2 is no longer held by any other list, item I2 becomes a floating item. As a result of these operations, Store 2 now has list L2(2), which holds proxy items that point to list L3 and item I2 in Store 1.

Move List Shallow Back—Cross Store

As previously discussed, it may be desirable that, when performing an operation, its reverse operation would result in the original organization. Such a situation is now shown in FIG. 9, in which the user desires to move list L2(2) from list L5 in Store 2 to list L1 in Store 1. In step 1, list L2(2) is serialized to create blob B1, which represents a duplicate of list L2(2). In step 2, it is determined whether a proxy item exists in Store 1 for list L2(2). In this case, such a proxy item does exist, so that proxy item is replaced with blob B1, which is deserialized to become list L2. In other words, the remote proxy item for list L2 is de-referenced to local Store 1. Also, list L2 is added to list L1 as requested by the user. If such a proxy item did not exist, then blob B1 would simply be deserialized and added to list L1 as list L2. In step 3, list L3 is added to list L2, to match the organization of the proxy item to L3 (in Store 2). In step 4, item I2 is added to list L2, to match the organization of the proxy item to item I2 (also in Store 2). This is done by de-referencing the proxy item for item I2 to local Store 1. In steps 5-7, the proxy items to list L3, item I2, and list L2(2) are expunged. The resulting organization, as shown in FIG. 9, is identical to the original organization shown in FIG. 8.

Move List Structure—Cross Store

A second version of the move list operation discussed herein is described in conjunction with FIG. 10. In this instance, the user has requested that list L2 and corresponding structure under list L2 be moved from list L1 in Store 1 to list L5 in Store 2. A user may want to copy the structure (but not all the non-list items in the structure) under where the structure supports a set of items that require extensive storage space. For example, a playlist may have multiple lists, one for each artist, with many music files under each list. The files in such a playlist may be expected to amount to gigabytes of music and/or video data. In such a case, the user may not want to waste storage space (and possibly network bandwidth) by duplicating these large files from a first store onto a second store but instead simply be able to reference the files in the original store using the copied structure in the second store. In step 1, list L2 is serialized into blob B1, which represents a duplicate of list L2. In step 2, blob B1 is deserialized into list L2(2), which is a copy of list L2 and is now held by list L5. Because this is a structure move command, the structure, or organization, under list L3 is also moved. In contrast, in the shallow move command discussed previously with regard to FIG. 8, only list L2 was moved. Therefore, in step 3, list L3 is serialized as blob B2, which represents a duplicate of list L3 and in step 4, blob B2 is deserialized as list L3(2), which is a copy of list L3 and is now held by list L2(2). There are also several non-list items (I1 and I2) held directly or indirectly by original list L2, but since these items are not structural they are not moved to Store 2. Instead, in steps 5 and 6, proxy items are created in Store 2 that point to items I1 and I2, which remain in Store 1. Also, because original lists L2 and L3 no longer exist in Store 1 (only their proxies, as will be discussed next), in step 7 the holding relationship between list L3 and item I1 is removed, in step 9 the holding relationship between list L2 and list L3 is removed, and in step 10 the holding relationship between list L2 and item I2 is removed. Because items I1 and I2 are not held by any other lists, items I1 and I2 become a floating items. Also, since lists L2 and L3 were originally held by other lists (lists L1 and L4, respectively), they cannot simply be removed without maintaining some reference to them in Store 1, for the benefit of being able to be listed by lists L1 and L4. Thus, in steps 8 and 11, lists L2 and L3 are each replaced with a proxy item in Store 1 pointing to lists L2(2) and L3(2), respectively, in Store 2.

Move List Structure Back—Cross Store

Referring to FIG. 11, the user now desires to perform the opposite function as performed in FIG. 10. In other words, the user now desires to structure move list L2(2) back to Store 1 under list L1. In step 1, list L2(2) is serialized as blob B1, which represents a duplicate of list L2(2), and in step 2 blob B1 is deserialized as list L2 and it is determined whether a proxy item pointing to list L2 exists in Store 1. In this case it does, so the proxy item is replaced with list L2. Likewise, in step 3, list L3(2) is serialized as blob B2, which represents a duplicate of list L3(2), and in step 4 blob B2 is deserialized as list L3 and replaces proxy item L3 in Store 1. In steps 5 and 6, a holding link is established between list L2 and item I2 and between list L3 and item I1. The system establishes these links so as to mirror the existing structure between list L2(2) and item I2 and between list L3(2) and item I1. In steps 7 and 9, the proxy items to items I1 and I2 are expunged. In steps 8 and 10, lists L2(2) and L3(2) are expunged. These operations result in Store 2 only having list L5 and the remaining lists being in Store 1. As can be seen, the resulting structure is identical to that which existed prior to the operation shown in FIG. 10.

Move List Deep—Cross Store

A third version of the move list operation discussed herein is described in conjunction with FIG. 12. In this instance, the user has requested that list L2 and all corresponding structure and items under list L2 be moved from list L1 in Store 1 to list L5 in Store 2. In step 1, list L2 is serialized as blob B1, which represents a duplicate of list L2, and in step 2 blob B1 is deserialized as list L2(2), which is a copy of list L2, in Store 2. Also, a holding link is established between list L5 and list L2(2). Since all of the structure and items under list L2 are to be moved to Store 2, the similar operations continue with respect to such remaining structure and items. Thus, in step 3, list L3 is serialized as blob B2, which represents a duplicate of list L3, and in step 4 blob B2 is deserialized as list L3(2). A holding link is established between list L2(2) and list L3(3), to mirror the structure existing in Store 1. In step 5, item I2 is serialized as blob B3, which represents a duplicate of item I2, and in step 6 blob B3 is deserialized as item I2(2). A holding link is established between list L2(2) and item I2(2), to mirror the structure existing in Store 1. In step 7, item I1 is serialized as blob B4, which represents a duplicate of item I1, and in step 8 blob B4 is deserialized as item I1(2). A holding link is established between list L3(2) and item I1(2), to mirror the structure existing in Store 1. In steps 9 and 10, items I1 and I2 are expunged from Store 1. Because lists L2 and L3 are held by multiple lists, they cannot simply be totally removed from Store 1. In other words, completely removing any trace of list L2, for example, would cause list L2 to no longer be listed by list L6, which is not likely to be the user's intention. Therefore, in steps 11 and 12, lists L2 and L3 are replaced with proxies in Store 1 that point to their respective target lists L2(2) and L3(3) in Store 2. Also, the holding links between lists L2 and L3 are removed, as are the holding links between lists L1 and L2. The result of these operations is that list L2, as well as all of the structure and items directly or indirectly held by list L2 (i.e., list L3 and items I1 and I2) have been moved from Store 1 to Store 2.

Move List Deep Back—Cross Store

Referring to FIG. 13, the user now desires to perform the opposite function as performed in FIG. 12. In other words, the user now desires to deep move list L2(2) back to Store 1 under list L1. In step 1, list L2(2) is serialized as blob B1, which represents a duplicate of list L2(2). In step 2, the proxy item pointing to list L2 is replaced with list L2 resulting from a deserialization of blob B1. Similarly, in step 3, list L3(2) is serialized as blob B2, which represents a duplicate of list L3(2), and in step 4, the proxy item pointing to list L3 is replaced with list L3 resulting from a deserialization of blob B2. This procedure is repeated for the non-list items as well. In step 5, item I2(2) is serialized as blob B3, which represents a duplicate of item I2(2), and in step 6, blob B3 is deserialized as item I2. Also, a holding relationship between list L2 and item I2 is established to match the previous holding relationship between list L2(2) and item I2(2). In step 7, item I1(2) is serialized as blob B4, which represents a duplicate of item I1(2), and in step 8, blob B4 is deserialized as item I1. Also, a holding relationship between list L3 and item I1 is established to match the previous holding relationship between list L3(2) and item I1(2). Then, in steps 9-12, items I1(2), I2(2), L3(2), and L2(2) are expunged, as they moving and not being held by any other item. If these items had been held by another item, then they would have been replaced with proxy items instead of being expunged. The result is the same structure as existed before the original Move List Deep command was performed in accordance with FIG. 12.

Copy List Shallow—Cross Store

Referring to FIG. 14, the user now desires to make a copy of list L2 from Store 1 into Store 2, and to organize the new copied list under list L5. However, the user does not desire to copy everything under list L2, only those items (both list items and non-list items) directly held by list L2. This is referred to as a shallow copy of a list. To perform this command, in step 1, list L2 (the list being copied) is serialized into blob B1, which represents a duplicate of list L2. In step 2, blob B1 is deserialized into new list L2(2), which is an identical copy of list L2, except that it is located in Store 2 instead of Store 1. Also, a holding relationship is created between existing list L5 and list L2(2), as desired by the user. If the user had decided to copy list L2 without placing it into another list in Store 2, then list L2(2) would be a floating item in Store 2. In step 3, a proxy item pointing to list L3 is created and held under list L2(2). This is done to match the holding relationship between original list L2 and original list L3. Similarly, in step 4, a proxy item pointing to item I2 is created and held under list L2(2). This is done to match the holding relationship between original item L2 and original list I2. The result is that list L2 has been copied, and proxy items pointing to the original items under list L2 have been placed under the copy of list L2 (i.e., list L2(2)). In this way, the system only makes a copy of the item (i.e., list L2) specifically selected by the user for copying, thus acting in a manner most likely to match the user's intentions.

Copy List Structure—Cross Store

A second version of the copy list operation is described in conjunction with FIG. 15. In this instance, the user has requested that list L2, and corresponding structure under list L2, be copied such that the copy is held under list L5 in Store 2. Accordingly, in step 1, list L2 is serialized into blob B1, which represents a duplicate of list L2. In step 2, blob B1 is deserialized as list L2(2), and a holding relationship is established between list L5 and list L2(2). In step 3, list L3 is serialized into blob B2, which represents a duplicate of list L3. In step 4, blob B2 is deserialized as list L3(2), and a holding relationship is established between list L2(2) and list L3(2) to match the holding relationship between list L2 and list L3. In steps 5 and 6, proxy items targeting items I1 and I2 are created and are each placed in a holding relationship to match items I1 and I2, respectively.

Thus, the result of this operation is that list L2, the non-list items directly held by list L2, and the structure held under list L2 have been copied into Store 2, whereas for those items held under list L2 but not directly under list L2, proxy items have been created in Store 2 targeting the original items in Store 1.

Copy List Deep—Cross Store

A second version of the copy list operation is described in conjunction with FIG. 16. In this instance, the user has requested that list L2, and all items under list L2, be deep copied such that the copy is held under list L5 in Store 2. This operation resembles the structure copy operation except that all items, regardless of whether they are lists or non-lists, are copied. Accordingly, in step 1, list L2 is serialized into blob B1, which represents a duplicate of list L2. In step 2, blob B1 is deserialized as list L2(2), and a holding relationship is established between list L5 and list L2(2). In step 3, list L3 is serialized into blob B2, which represents a duplicate of list L3. In step 4, blob B2 is deserialized as list L3(2), and a holding relationship is established between list L2(2) and list L3(2) to match the holding relationship between list L2 and list L3. In steps 5 and 6, instead of creating proxy items, items I1 and I2 are copied onto Store 2. Thus, in step 5, item I2 is serialized as blob B3, which represents a duplicate of item I2. In step 6, blob B3 is deserialized into item I2(2), which is held under list L2(2) to match the holding relationship between list L2 and item I2. Likewise, in step 7, item I1 is serialized as blob B4, which represents a duplicate of item I1. In step 8, blob B4 is deserialized into item I1(2), which is held under list L3(2) to match the holding relationship between list L3 and item I1. Thus, the result of this operation is that list L2 as well as all of the items under list L2 have been copied into Store 2.

Expunge

FIG. 17 illustrates an example item structure that will be used in connection with a discussion on expunging of items and multiple user access to items. There is a tension between allowing multiple users to access the same items and allowing individual users to expunge or otherwise remove those items without consent of the other user(s).

In this illustrative structure of FIG. 17, a root workspace "\" directly holds workspaces U1 and U2, which represent workspaces authorized to user1 and user2, respectively. Workspace U1 directly holds workspaces "UDR1" and "Shared." Workspace U2 directly holds workspace "UDR2." Workspaces UDR1 and Shared both directly hold list L1. Workspace UDR2 directly holds list L2. Lists L1 and L2 both directly hold item I1.

Assume in this example that user1 has created list L1 and item I1, and has shared these two items with user2 by way of establishing a holding link between L1 and Shared (i.e., by placing list L1 in workspace Shared). Further assume that user2 subsequently added item I1 to list L2. User2 has thus has full rights list L1 and item I1. However, assume that user1 has no rights to list L2. In this case, there are various organization and lifetime operations available to user1. For example, user1 may remove item I1 from list L1. Item I1 would remain in list L2 as well as both workspaces UDR1 and Shared. Alternatively, user1 may remove list L1 from all lists. In this case, item I1 would still remain in list L2. Alternatively, user1 may remove list L1 from either workspace UDR or workspace Shared. In this case, list L1 and item I1 would no longer be available in the workspace from which list L1 would be removed. However, this would have no effect on other workspaces.

Another option is that user1 may remove list L1 from all workspaces. In this case, list L1 would be expunged from the store altogether. User1 would relinquish interest in item I1, and item I1 would only be available to user2 in list L2. Yet another option is that user1 may relinquish interest in item I1, perhaps because user1 does not need item I1 any longer and does not care what happens to it. Item I1 is therefore now available only to user2 in list L2. Still another option is that user1 may expunge item I1. In this case, the holding link from list L1 to item I1 is deleted. However, the link from list L2 to item I1 may dangle (i.e., would exist but not point to any item). The dangling link may remain or may be cleaned up automatically the next time list L2 is opened or at any other time.

Recycle

Recycling of items is discussed with reference to FIG. 18, which is divided into five labeled portions. As shown in portion 1 of FIG. 18, a root workspace " " directly holds workspaces U1 and U2, which each represent workspaces authorized to user1 and user2, respectively. Workspace U1 directly holds list L1, which in turn directly holds item I1. Workspace U2 directly holds list L2, which in turn also directly holds item I1. Thus, item I1 is shared by lists L1 and L2.

With reference to portion 2 of FIG. 18, assume that user1 wishes to recycle item I1. In this case, item I1 would be recycled from the point of view of user1 (as indicated by the broken line emanating from workspace U1. However, from the point of view of user2, item I1 would still remain in list L2. With reference to portion 3 of FIG. 18, if user1 empties the recycle bin, then user1 has relinquished all interest in item I1. However, again, item I1 remains in list L2 of user2, since user2 did not request any operations on item I1.

Next, with reference to portion 4 of FIG. 18, assume that user2 thereafter wishes to recycle item I1 after user1 has emptied the recycle bin. In this case, item I1 would appear to be in the recycle bin from the point of view of user2 (as indicated by the broken line emanating from workspace U2. With reference to portion 5 of FIG. 18, when user2 empties the recycle bin, item I1 becomes totally deleted since no other lists are holding item I1. Had another list held item I1, item I1 still would have remained held under that other list.

CONCLUSION

Thus, a novel electric file system and ways to manage items in such a system has been described. While illustrative embodiments as described herein in accordance with various aspects of the present invention are shown by way of example, it will be understood that the invention is not limited to these embodiments.

What is claimed is:

1. A computer-readable storage medium storing computer-executable instructions that, when executed, cause the computer to perform a method, the computer having an electronic file system with access to first and second stores, the method comprising steps of:
    selecting a first item from the first store, the first item being organized under a first list in the first store;
    responsive to first item being selected, determining whether the first item is simultaneously organized under a second list in the first store;
    serializing the first item as binary large object ("BLOB");
    deserializing the BLOB into a second item in the second store, wherein the second item comprises a duplicate of the first item;
    storing a second item in the second store, wherein the second item includes metadata;
    responsive to determining that the first item is organized under the second list, converting the first in the first store into a first proxy item in the first store targeting the second item in the second store, the first proxy item being organized under the second list but not the first list, wherein the first proxy item is a shortcut to the second item in the second store and wherein the first proxy item includes the metadata of the second item;
    selecting the second item in the second store;
    responsive to the second item being selected, determining whether the first proxy item exists in the first store;
    responsive to determining that the first proxy item exists, removing the first proxy item from the first store; and
    storing a third item in the first store based on the second item.

2. The computer-readable storage medium of claim 1, the method further including a step of generating the third item as a duplicate of the second item.

3. The computer-readable storage medium of claim 1, wherein each of the first and second items is a file.

4. The computer-readable storage medium of claim 1, wherein each of the first and second items is a list.

5. The computer-readable storage medium of claim 1, wherein the first item is organized under both the first and second lists.

6. A computer-readable storage medium storing computer-executable instructions that, when executed, cause the computer to perform a method, the computer having an electronic file system with access to first and second stores, the method comprising steps of:
    selecting a first list from the first store;
    storing a second list in the second store based on the first list, wherein the second list is a duplicate of the first list;
    determining whether a file is organized directly under the first list;
    responsive to determining that the file is organized directly under the first list, creating a proxy item in the second store targeting the file in the first store, the proxy item being organized under the second list, wherein the proxy item links to the file in the first store;
    determining whether a third list is organized under the first list; and
    responsive to determining that the third list is organized under the first list, creating a fourth list in the second store based on the third list, the fourth list being organized under the second list.

7. The computer-readable storage medium of claim 6, the method further including a step of maintaining the first list in the first store beyond the step of creating the proxy item.

8. The computer-readable storage medium of claim 6, wherein the fourth list is a duplicate of the third list.

9. A computer-readable storage medium storing computer-executable instructions that, when executed, cause the computer to perform a method, the computer having an electronic file system with access to first and second stores, the method comprising steps of:
    selecting a first list from the first store, the first list having a second list organized under the first list, wherein a non-list item is organized directly under the second list;
    determining whether the second list is simultaneously organized directly under a third list, wherein the third list is different than the first list;
    serializing the second list as a binary large object ("BLOB");
    deserializing the BLOB into a duplicate of the second list in the second store;
    creating a first proxy item in the duplicate of the second list, wherein the first proxy item links to the non-list item and wherein the first proxy item includes metadata of the non-list item;
    removing the second list from the first store; and
    responsive to determining that the second list is organized directly under the third list, creating a second proxy item in the first store targeting the second list now in the second store, the second proxy item being organized directly under the third list.

10. The computer-readable storage medium of claim 9, wherein the non-list item is a file.

* * * * *

UNITED STATES PATENT AND TRADEMARK OFFICE
CERTIFICATE OF CORRECTION

PATENT NO. : 7,801,854 B2  
APPLICATION NO. : 10/986961  
DATED : September 21, 2010  
INVENTOR(S) : Timothy P. McKee et al.

Page 1 of 1

It is certified that error appears in the above-identified patent and that said Letters Patent is hereby corrected as shown below:

In column 13, line 32, in Claim 1, delete "the" and insert -- a --, therefor.

In column 13, line 38, in Claim 1, after "to" insert -- the --.

In column 13, line 41, in Claim 1, after "as" insert -- a --.

In column 13, line 46, in Claim 1, delete "a" and insert -- the --, therefor.

In column 13, line 49, in Claim 1, after "first" insert -- item --.

Signed and Sealed this
Tenth Day of May, 2011

David J. Kappos
*Director of the United States Patent and Trademark Office*